2,913,429
FILM FORMING SYNTHETIC LATEXES COMPRISING COPOLYMER SULFONATES AND METHOD OF MAKING SAME

Vernon D. Floria and Richard A. Mock, Midland, Mich., assignors to The Dow Chemical Company, Midland, Mich., a corporation of Delaware No Drawing. Original application March 30, 1956, Serial No. 574,946. Divided and this application July 29, 1958, Serial No. 751,639

20 Claims. (Cl. 260—29.7)

This invention concerns certain new film-forming synthetic latexes and a method of making the same. The present application is a division of, and a substitute for, a copending application of the same inventors, Serial No. 574,946, filed March 30, 1956, and now abandoned.

The synthetic latexes which are provided by the invention are aqueous dispersions of copolymers of one or more aliphatic conjugated diolefines with at least two monovinyl aromatic compounds, including a monovinyl aromatic sulfonate, and an unsulfonated monovinyl aromatic compound such as a monovinyl aromatic hydrocarbon or a nuclear halogenated monovinyl aromatic hyhydrocarbon. These aqueous dispersions, or colloidal solutions, of the copolymers can be prepared in the presence or absence of conventional emulsifying agents. They are exceptionally stable against coagulation by freezing and thawing or by addition of soluble inorganic salts such as sodium chloride, potassium chloride, sodium sulfate, potassium sulfate, or calcium chloride, etc. These synthetic latexes can be spread in thin layers on solid surfaces, e.g. of wood, glass, metals, etc., and dried to obtain adherent continuous films of the copolymers. When dried, the films can readily be removed from the base members by washing or scrubbing with water. Accordingly, these synthetic latexes are useful as coating compositions for the casting and forming, on supporting surfaces, of adherent, but readily removable, protective films of the copolymers. Conventional additives such as dyes or pigments, plasticizers, thickening agents, etc., can be admixed with these synthetic latexes to form water-base paints or other modified coating compositions. Paints thus-prepared can be applied to, and dried on, surfaces of wood, glass, or metal, etc., to obtain decorative coatings that can be removed, when desired, by washing with water. Such removable paints can be used for the temporary decoration of store windows, etc.

The colloidally dispersed polymeric ingredients of these synthetic latexes are copolymers of a total of from 4 to 35, preferably from 5 to 15, weight percent of one or more monovinyl aromatic sulfonates, a total of from 5 to 40, preferably from 20 to 40, weight percent of either or both of the compounds, 1,3-butadiene and isoprene, and a total of from 93 to 25, preferably from 77 to 45, percent of one or more unsulfonated monovinyl aromatic compounds such as styrene, ar-vinyltoluene, ar-monochlorostyrene, and ar-dichlorostyrene, etc. Any salt of an ar-monovinyl aromatic sulfonic acid, which salt can be dissolved in water to form a solution containing at least 3 percent by weight of the same, can be used as a starting material in making the copolymers. Examples of suitable monovinyl aromatic sulfonates are the sodium, potassium, and calcium salts of styrene sulfonic acid, ar-vinyltoluene sulfonic acid, or ar-chlorostyrene sulfonic acid, etc. Copolymers of styrene, butadiene, and p-styrene sulfonates are usually employed.

The synthetic latexes of the invention can be prepared by heating the above-mentioned polymerizable starting materials, in the proportions theoretically required to form the copolymers, together with a water soluble polymerization catalyst and sufficient water to dissolve the water-soluble catalyst and the vinyl aromatic sulfonate. It is essential, in order to obtain a copolymer latex of good quality, that the polymerization mixture include a highly ionizable, water-soluble salt, e.g. having an ionization constant of $10^{-5}$ or higher, such as sodium chloride, potassium chloride, calcium chloride, sodium sulfate, potassium sulfate, sodium bromide, or potassium bromide, etc. Alkali nitrites are preferably excluded from the mixture since they function as polymerization inhibitors and in this respect differ from other salts such as those just mentioned. Such ionizable salts other than nitrites appear to serve as catalyst, or catalyst promoters, for formation of the copolymers by reaction of the non-homogeneous mixture. The presence of sodium bromide in amount corresponding to at least 0.25 percent of the weight of the vinyl aromatic sulfonate, or of a chemically equivalent amount of other highly ionized water-soluble inorganic salts, such as those just mentioned, is usually sufficient for the purpose. The ionizable inorganic salts can be present in amounts as great as 15 percent or more of the weight of the vinyl aromatic sulfonates. Sodium p-styrene sulfonate usually contains, as an impurity, sufficient of an alkali metal halide or an alkaline earth metal halide, e.g. NaBr, KBr, $CaBr_2$, or a corresponding metal chloride, to serve the purpose.

It is necessary that the polymerization mixture include a water-soluble peroxy compound as a catalyst ingredient and it is desirable, but not essential, that it also include an oil-soluble catalyst ingredient. Examples of suitable water-soluble polymerization catalysts are sodium persulfate, potassium persulfate, and ammonium persulfate, etc. Examples of suitable oil-soluble polymerization catalysts are the organic peroxy compounds such as dibenzoyl peroxide, or dilauroyl peroxide, etc. Mixtures of the alkali persulfates and the oil-soluble organic peroxides are highly effective and are preferred. A mixture of about equal weights of an alkali persulfate and an organic peroxide such as dibenzoyl peroxide or dilauroyl peroxide is preferred. The mixed catalyst is more active and apparently has less tendency to cause, or permit, coagulation of the copolymer product than the water-soluble catalyst alone. An amount of catalyst corresponding to from 0.1 to 2, preferably from 0.5 to 1, percent of the combined weight of the polymerizable compounds is usually employed. The catalyst can be used in larger proportions if desired.

A mixture of these several starting materials, in the relative proportions above-indicated, can be heated, e.g. at temperatures of from 40° to 120° C., preferably from 60° to 80° C., to form a latex of the colloidally dispersed copolymer. A portion of the copolymer sometimes coagulates as a button during the polymerization reaction.

The polymerization is advantageously accomplished in the absence of conventional emulsifying agents, but any of the usual emulsifying agents can be added, if desired.

It has been found that the amount of button formed decreases with increase in the proportion of water present. There is also less tendency toward button formation when using a mixture of water-soluble and oil-soluble polymerization catalysts than when using either such catalyst alone.

The polymerization is preferably carried out while preventing free access of air to the mixture. For instance, it can be accomplished in a closed vessel such as a bomb or autoclave. Any air is preferably swept from the vessel with an inert gas or vapor such as nitrogen, or helium, etc., prior to carrying out the polymerization.

The polymerization is often carried out in a manner such as to avoid formation of a latex containing more than 25 weight percent of the copolymer, since it has been observed that the tendency toward coagulation of the copolymer becomes greater when the copolymer is formed at higher concentrations. However, it is possible, by careful choice of the polymerization conditions, to form a latex containing more than 40 weight percent of the copolymer without coagulation occurring to more than a minor extent. The formation of a latex of higher concentration than desired can be avoided by use of a sufficiently large proportion of water in the polymerization mixture, or by terminating the reaction when the copolymer has been formed in the desired concentration.

After carrying out the polymerization to the desired extent, the vessel is opened, and any coagulated polymeric material is removed, e.g. by filtering or decanting, from the copolymer latex product. Any unconsumed monomeric material, if present, can be vaporized from the latex.

The copolymer latexes thus obtained are exceptionally stable against coagulation. For instance, latexes prepared under the preferred conditions hereinbefore described can be frozen and thawed or can be treated with half of their volume of an aqueous 10 weight percent calcium chloride solution without coagulating the copolymer ingredient thereof. The latexes can be spread as a thin layer and dried on a supporting surface, e.g. of glass, steel, or wood, to obtain adherent continuous films of the copolymers.

The following examples describe ways of practicing the invention and illustrate certain of its advantages, but are not to be construed as limiting its scope.

EXAMPLE 1

To a frozen mixture of 125 parts by weight of water, 78 parts of styrene, 5 parts of sodium p-styrene sulfonate containing from 1 to 2 weight percent of sodium bromide, 0.4 part of sodium bicarbonate, 0.8 part of sodium persulfate and 0.64 part of sodium meta-bisulfite there was added 42 parts of liquefied butadiene. Air was swept, by a stream of nitrogen, from the vessel containing the mixture and the vessel was closed. The vessel and its contents were warmed to 70° C. and shaken while at that temperature for 24 hours. The vessel was then opened, and a minor amount of the butadiene, that remained unconsumed, was vented. Also, about 27 grams of solid polymeric material that had formed and agglomerated was removed. The remaining product was a latex, i.e. an aqueous colloidal solution, which contained approximately 39 weight percent of the dispersed copolymer product. A portion of the latex, when spread as a thin layer on a glass plate, dried to form a tightly adhering, clear, transparent film of the coplymer. Another portion of the latex was frozen and thawed four times without coagulating the copolymer ingredient. An addition of a concentrated aqueous calcium chloride solution to a portion of the latex in amount such that the resulting solution contains 10 percent by weight of calcium chloride does not cause coagulation of the copolymer ingredient.

EXAMPLE 2

In each of three experiments, the amount of sodium p-styrene sulfonate, of about 95 weight percent purity, indicated in the following table was dissolved in 120 parts by weight of water. The sodium p-styrene sulfonate contained from 1 to 2 percent by weight of sodium bromide as an impurity. To the solution there were added styrene in the amount indicated in the table and 0.3 part by weight of sodium persulfate and 0.3 part of benzoyl peroxide. Air was swept by nitrogen from a glass vessel containing the mixture and 24 parts by weight of 1,3-butadiene was added to the mixture. The vessel was then closed and was shaken and heated at 75° C. for 18 hours. The vessel was then cooled and opened and the reaction mixture was removed. The mixture comprised an aqueous latex of a colloidally dispersed copolymer of styrene, butadiene, and sodium styrene sulfonate together with a body, or button, of a coagulated portion of the copolymer. The wet button was removed and weighed. A portion of the remaining latex was analyzed to determine the solids content thereof, which corresponds approximately to the percent by weight of copolymer product dispersed therein. Table I gives the parts by weight of styrene and of sodium p-styrene sulfonate present in each of the starting mixtures. It also gives the parts by weight of wet copolymer button that was removed from the reaction mixture in each experiment and the solids content of the remaining aqueous copolymer latex. In the table sodium p-styrene sulfonate is abbreviated as "NaSS."

*Table I*

| Run No. | Starting Mixture Contains | | Results | |
|---|---|---|---|---|
| | Pts. by weight of Styrene | Pts. by weight of NaSS | Button, Pts. by weight | Solids in Latex, weight percent |
| 1 | 52.8 | 3.2 | 105 | 35 |
| 2 | 52.0 | 4.0 | 45 | 36 |
| 3 | 48.0 | 8.0 | 5 | 40 |

EXAMPLE 3

In each of a number of experiments a mixture of 0.44 part by weight of sodium persulfate, 0.42 part of sodium bicarbonate, 0.05 part of the sodium salt of N',N-ethylenediaminetetracetic acid, and styrene, 1,3-butadiene, sodium p-styrene sulfonate and water in the respective amounts hereinafter indicated, was heated at 70° C. under an atmosphere of nitrogen in a closed vessel for 24 hours. The sodium styrene sulfonate contained from 1 to 2 percent of sodium bromide as an impurity. A latex of a copolymer of styrene, butadiene, and sodium styrene sulfonate, in approximately the same relative proportions as in the starting mixture, was obtained. All of the copolymer was dispersed as colloidal particles in the latex, i.e. no button of coagulated polymeric material was obtained. Each latex contained between 20 and 25 percent of the copolymer in the form of particles having an average diameter of about 1800 Angstrom units. Table II gives the parts by weight of water and of the respective polymerizable starting materials employed in each experiment. In the table, water and butadiene are designated by their formulas and sodium styrene sulfonate as abbreviated as 'NaSS."

*Table II*

| Run No. | Principal Ingredients of Starting Mixture | | | |
|---|---|---|---|---|
| | $H_2O$, Pts. | Styrene, Pts. | $C_4H_6$, Pts. | NaSS, Pts. |
| 1 | 180 | 28 | 15 | 2 |
| 2 | 190 | 27 | 16 | 4 |
| 3 | 200 | 26 | 16 | 6 |
| 4 | 210 | 24 | 16 | 10 |
| 5 | 220 | 19 | 16 | 20 |

EXAMPLE 4

In each of several experiments, a stainless steel bomb was charged with 500 parts by weight of water, 312 parts of styrene, 168 parts of butadiene, 21 parts of sodium p-styrene sulfonate, 2.5 parts of sodium bicarbonate, and with the amounts of sodium persulfate, benzoyl peroxide and sodium bromide indicated in Table III. In charging the bomb, the ingredients other than butadiene were introduced and air was swept from the bomb with nitrogen. The butadiene was then added and the bomb was closed. The bomb was shaken and heated at 70° C. and, at measured intervals, aliquot portions of the resulting copolymer latex were withdrawn through a valved outlet and tested to determine the percent by weight of the resulting copolymer of styrene, butadiene and sodium styrene sulfonate colloidally dispersed therein. In certain of the experiments at one hour intervals after the start of the polymerization, there were added, by injection through a valved inlet under pressure, four successive portions of an aqueous sodium persulfate solution, each of which portions consisted of 1 part by weight of sodium persulfate in 10 parts of water. After completing each experiment, the bomb was cooled, opened, and any coagulated polymeric material, i.e. any of the so-called "button," was removed from the reaction mixture, squeezed to remove adsorbed latex therefrom, and weighed. Also, the percent by weight of colloidally dispersed polymer in the latex product was determined after completing the experiment. The following table gives the parts by weight of benzoyl peroxide, sodium persulfate, and of sodium bromide present in each of the starting mixtures. It indicates the experiments in which added portions of an aqueous sodium persulfate solution were introduced by injection under pressure during the polymerization. The table also gives the time in hours after the start of each polymerization reaction at which a sample of the latex product was withdrawn for testing and it gives the weight percent of dispersed copolymer in the sample. The table further gives the total hours of heating at 70° C. in carrying out each polymerization; the amount of copolymer "button" formed, expressed as percent of the combined weight of styrene, butadiene and sodium styrene sulfonate initially charged to the bomb, and the percent by weight of colloidally dispersed copolymer in the final latex product. In the table benzoyl peroxide is abbreviated as "Bz$_2$O$_2$."

*Table III*

| Run No. | Starting Mixture Comprises | | | Na$_2$S$_2$O$_8$ added during polymerization | Time of sampling, Hrs. | Percent solids in latex when sampled | Percent Button Formed |
|---|---|---|---|---|---|---|---|
| | Bz$_2$O$_2$, Pts. | Na$_2$S$_2$O$_8$, Pts. | NaBr, Pts. | | | | |
| 1 | None | 5 | 0.5 | No | 0 | 3.0 | |
| | | | | | 15.5 | 7.0 | |
| | | | | | 21.5 | 9.0 | |
| | | | | | 24.0 | 16.0 | |
| | | | | | 39.5 | 19.1 | 5.0 |
| 2 | None | 1 | 0.5 | Yes | 0 | 3.0 | |
| | | | | | 19.0 | 18.1 | |
| | | | | | 20.0 | 14.3 | |
| | | | | | 21.0 | 8.8 | |
| | | | | | 24.0 | 8.7 | |
| | | | | | 25.5 | 8.4 | 75.0 |
| 3 | None | 1 | 2.45 | Yes | 0 | 3.6 | |
| | | | | | 3.0 | 8.8 | |
| | | | | | 20.0 | 16.8 | |
| | | | | | 21.5 | 20.8 | 6.0 |
| 4 | 5 | 5 | 2.45 | No | 0 | 4.1 | |
| | | | | | 15.5 | 40.5 | |
| | | | | | 17.5 | 43.5 | |
| | | | | | 19.0 | 44.0 | |
| | | | | | 22.5 | | 75.0 |

In each of the runs 1–3 of the above table, sodium persulfate, a water-soluble compound, was used as the only polymerization catalyst. From a comparison of run 2 with run 1 it will be seen that the portionwise addition of the sodium persulfate catalyst during the polymerization caused an increase in the rate of polymerization, but also caused a large increase in the proportion of the copolymer product which became coagulated and a resulting decrease in concentration of colloidally dispersed copolymer in the final latex product. Run 3, as compared with run 2, shows that by increasing the proportion of sodium bromide in the polymerization, the amount of copolymer that becomes coagulated is reduced and the concentration of the latex product is thereby increased. Run 4 as compared with run 3, shows that by employing a combination of a water-soluble catalyst and an oil-soluble catalyst (benzoyl peroxide), instead of only the water-soluble catalyst, the rate of the copolymerization reaction was increased greatly and coagulation of the copolymer product did not occur to any great extent until the polymerization was nearly complete.

EXAMPLE 5

In each of a series of experiments a mixture of 120 parts by weight of water, 4 parts of sodium p-styrene sulfonate containing from 1 to 2 percent by weight of sodium bromide, 0.3 part of sodium persulfate, 0.3 part of benzoyl peroxide, and the amounts of styrene and of 1,3-butadiene indicated in the following table was agitated and heated at 70° C. in contact with nitrogen in a closed vessel for 18 hours. The vessel was then opened and the charge removed. The reacted mixture was a latex of the colloidally dispersed copolymer together with a button of coagulated copolymer. The button was removed, absorbed latex was squeezed therefrom, and the button was weighed. The remaining latex was tested to determine its solids content. The following table gives the parts by weight of styrene and of butadiene, in each of the starting mixtures. It gives the amount of copolymer button, expressed as percent of the combined weight of the polymerizable starting materials. It also gives the percent by weight of colloidally dispersed copolymer in the latex product.

*Table IV*

| Run No. | Starting Mixture Comprises | | Results | |
|---|---|---|---|---|
| | Styrene, Pts. | C$_4$H$_6$, Pts. | Percent Button | Percent Conc. of Latex |
| 1 | 72 | 4 | 56.3 | 41 |
| 2 | 68 | 8 | 43.8 | 39 |
| 3 | 64 | 12 | 42.5 | 37 |
| 4 | 60 | 16 | 37.5 | 36 |
| 5 | 48 | 28 | 37.5 | 35 |
| 6 | 44 | 32 | 37.5 | 35 |

EXAMPLE 6

In each of a number of experiments, a mixture of water, 1,3-butadiene, the vinyl aromatic compound indicated in the following table, the salt of p-styrene sulfonate which is also indicated, benzoyl peroxide and sodium persulfate was subjected to polymerization by agitating and heating the same in contact with nitrogen in a closed vessel at the temperature and for the time given in Table V. The vessel was then cooled, opened, and the weight percent solids content of the resulting latex of the several polymerizable starting materials was determined. The table identifies and gives the proportions, as parts by weight, of the several starting materials. The catalyst which is referred to is a mixture of equal parts by weight of benzoyl peroxide and sodium persulfate. It also gives the solids content, expressed as percent by weight of the latex product. This corresponds approximately to the percent by weight of the colloidally dispersed copolymer in the latex. The copolymer is that of the polymerizable starting materials in about the relative proportions in which they were employed.

Table V

| Run No. | Starting Mixture | | | | | | Polymerization Conditions | | | Latex, Percent Solids Content |
|---|---|---|---|---|---|---|---|---|---|---|
| | H₂O, Pts. | C₄H₆, Pts. | Vinyl Aromatic Compound | | Styrene Sulfonate | | Catalyst, Pts. | Time, Hrs. | Temp., °C. | |
| | | | Kind | Pts. | Kind | Pts. | | | | |
| 1 | 120 | 28 | 2,5-dichlorostyrene | 48 | Na | 4 | 0.6 | 18 | 75 | 20 |
| 2 | 120 | 16 | ___do___ | 60 | Na | 4 | 0.6 | 18 | 75 | 18 |
| 3 | 120 | 28 | Vinyltoluene | 48 | Na | 4 | 0.6 | 18 | 75 | 18 |
| 4 | 140 | 15 | Styrene | 42 | Ca | 3 | 0.6 | 18 | 75 | 28 |
| 5 | 120 | 28 | ___do___ | 48 | Triethyl-ammonium / Na | 3 / 1 | 0.6 | 10 | 80 | 39 |

We claim:

1. A coating composition comprising an aqueous colloidal dispersion of a copolymer of between 4 and 35 percent by weight of at least one water-soluble salt of an ar-monovinyl aromatic monosulfonic acid, from 5 to 40 percent of at least one aliphatic conjugated diolefine containing from 4 to 5 carbon atoms in the molecule and having only 4 carbon atoms in a chain of the molecule, and from 93 to 25 percent of at least one unsulfonated monovinyl aromatic compound of the class consisting of vinyl aromatic hydrocarbons and nuclear halogenated vinyl aromatic hydrocarbons.

2. A coating composition comprising a aqueous colloidal dispersion of a copolymer of between 5 and 15 percent by weight of at least one water-soluble salt of an ar-monovinyl aromatic monosulfonic acid, from 20 to 40 percent of a least one aliphatic conjugated diolefine containing from 4 to 5 carbon atoms in the molecule and having only 4 carbon atoms in a chain of the molecule, and from 77 to 45 percent of at least one unsulfonated monovinyl aromatic compound of the class consisting of vinyl aromatic hydrocarbons and nuclear halogenated vinyl aromatic hydrocarbons, which composition can be frozen and thawed and can be treated with at least half its volume of an aqueous 10 percent calcium chloride solution without becoming coagulated.

3. A coating composition, as claimed in claim 2, wherein the copolymer ingredient consists essentially of a copolymer of styrene, butadiene and a water-soluble salt of an ar-styrene sulfonic acid.

4. A coating composition, as claimed in claim 2, wherein the copolymer ingredient consists essentially of a copolymer of styrene, butadiene, and sodium p-styrene sulfonate.

5. A coating composition, as claimed in claim 2, wherein the copolymer ingredient consists essentially of a copolymer of vinyltoluene, butadiene, and sodium p-styrene sulfonate.

6. A coating composition, as claimed in claim 2, wherein the copolymer ingredient consists essentially of a copolymer of 2,5-dichlorostyrene, butadiene and sodium p-styrene sulfonate.

7. A coating composition, as claimed in claim 2, wherein the copolymer ingredient consists essentially of a copolymer of styrene, butadiene and calcium p-styrene sulfonate.

8. A coating composition, as claimed in claim 2, wherein the copolymer ingredient consists essentially of a copolymer of styrene, butadiene, triethylammonium p-styrene sulfonate, and sodium p-styrene sulfonate.

9. A coating composition, as claimed in claim 2, consisting essentially of an aqueous colloidal solution, of the copolymer, that is substantially free of added emulsifying agents.

10. A coating composition, as claimed in claim 9, wherein the copolymer ingredient consists essentially of a copolymer of styrene, butadiene and a water-soluble salt of an ar-vinyl aromatic sulfonic acid.

11. A coating composition, as claimed in claim 9, wherein the copolymer ingredient consists essentially of a copolymer of styrene, butadiene and sodium p-styrene sulfonate.

12. A coating composition, as claimed in claim 9, wherein the copolymer ingredient consists essentially of a copolymer of vinyltoluene, butadiene, and a water-soluble salt of an ar-vinyl aromatic sulfonic acid.

13. A coating composition, as claimed in claim 9, wherein the copolymer ingredient consists essentially of a copolymer of vinyltoluene, butadiene and sodium p-styrene sulfonate.

14. A coating composition, as claimed in claim 9, wherein the copolymer ingredient consists essentially of a copolymer of 2,5-dichlorostyrene, butadiene and sodium p-styrene sulfonate.

15. A coating composition, as claimed in claim 9, wherein the copolymer ingredient consists essentially of a copolymer of styrene, butadiene and calcium p-styrene sulfonate.

16. A coating composition, as claimed in claim 9, wherein the copolymer ingredient consists essentially of a copolymer of styrene, butadiene, triethylammonium p-styrene sulfonate and sodium p-styrene sulfonate.

17. A method of making a stable, film-forming aqueous copolymer dispersion that is effective as a coating composition, which method comprises agitating and heating at a polymerization temperature in the substantial absence of air, a mixture of from 4 to 35 percent by weight of at least one ar-vinyl aromatic monosulfonate that is sufficiently soluble in water to permit formation at room temperature of an aqueous 3 weight percent solution thereof, from 20 to 40 percent of an aliphatic conjugated diolefine containing from 4 to 5 carbon atoms in the molecule and having only 4 carbon atoms in a chain of the molecule, and from 25 to 78 percent of an unsulfonated monovinyl aromatic compound of the class consisting of vinyl aromatic hydrocarbons and nuclear halogenated vinyl aromatic hydrocarbons that is free of reactive groups other than the vinyl radical, the proportions just expressed being based on the combined weight of the above-mentioned polymerizable starting materials, together with water, a water-soluble alkali persulfate as a polymerization catalyst and an amount of other water-soluble and ionizable inorganic salt chemically equivalent to the presence of sodium bromide in a proportion corresponding to at least 0.25 percent of the weight of the vinyl aromatic sulfonate, said other ionizable inorganic salt having an ionization constant at least as high as $10^{-5}$ and said alkali persulfate, other ionizable inorganic salt and the ar-vinyl aromatic sulfonate being present as an aqueous solution thereof, and the polymerization catalyst being employed in a proportion corresponding to from 0.1 to 2 percent of the combined weight of the above-mentioned aliphatic conjugated diolefine and vinyl aromatic compounds.

18. A method, as claimed in claim 17, wherein an organic peroxide containing the peroxy group as the only functional group in the molecule is also initially added, as a polymerization catalyst, to the polymerization mixture and the latter is substantially free of added emulsifying agents.

19. A method, as claimed in claim 18, wherein the polymerization mixture initially comprises a water-soluble and ionizable metal bromide in amount corresponding to from about 0.25 to about 15 percent of the weight of the vinyl aromatic sulfonate.

20. A method, as claimed in claim 18, wherein sodium bromide is present as an ionizable inorganic salt ingredient and an oil-soluble, organic peroxide containing the peroxy group as the only functional group in the molecule is also present, as a polymerization catalyst, in the polymerization mixture during the polymerization reaction.

No references cited.